(12) United States Patent
Kaneko et al.

(10) Patent No.: US 12,689,045 B2
(45) Date of Patent: Jul. 21, 2026

(54) GAS SUPPLY DEVICE

(71) Applicant: TOYOTA JIDOSHA KABUSHIKI KAISHA, Toyota (JP)

(72) Inventors: Keiichi Kaneko, Mishima (JP); Yoshikatsu Fujimura, Toyota (JP); Naoki Tomi, Kawasaki (JP); Koji Sugiura, Toyota (JP); Kei Kato, Nagakute (JP); Tomoki Nakashima, Nagoya (JP); Tetsuya Tonosako, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 19/019,750

(22) Filed: Jan. 14, 2025

(65) Prior Publication Data

US 2025/0314354 A1 Oct. 9, 2025

(30) Foreign Application Priority Data

Apr. 9, 2024 (JP) ................................. 2024-062499

(51) Int. Cl.
*F17C 7/00* (2006.01)
*H01M 8/04082* (2016.01)

(52) U.S. Cl.
CPC ........... *F17C 7/00* (2013.01); *H01M 8/04201* (2013.01); *F17C 2201/0109* (2013.01);
(Continued)

(58) Field of Classification Search
CPC .... F17C 7/00; F17C 13/084; F17C 2205/037; F17C 2205/0326; F17C 2205/0388;
(Continued)

(56) References Cited

U.S. PATENT DOCUMENTS 3,924,654 A * 12/1975 Buller ..................... F16L 37/44
251/149.4
7,419,060 B2 * 9/2008 Arthur ..................... C01B 3/32
429/513

(Continued)

FOREIGN PATENT DOCUMENTS

CN 116857549 A * 10/2023 ................ F17C 5/06
EP 1942542 A1 * 7/2008 ........ H01M 8/04216
(Continued)

*Primary Examiner* — David Colon-Morales
(74) *Attorney, Agent, or Firm* — SoraIP, Inc.

(57) ABSTRACT

The gas supply device disclosed in the present specification includes a cover that shuts off the periphery of the main stop valve and the connector of the gas cartridge from the outside air, and a removal device that removes impurities from the inner space of the cover in a state where the connector and the main stop valve are not connected. The controller of the gas supply device connects the main stop valve and the connector when impurities are removed from the inner space by the removal device, and opens the main stop valve. The gas supply device disclosed herein shuts off the periphery of the main stop valve and the connector from the outside air and removes impurities from the periphery of the main stop valve. Therefore, contamination of the gas supply device with impurities can be suppressed.

5 Claims, 4 Drawing Sheets

(52) U.S. Cl.
CPC .................. *F17C 2201/058* (2013.01); *F17C 2205/0326* (2013.01); *F17C 2205/037* (2013.01); *F17C 2221/012* (2013.01); *F17C 2265/06* (2013.01)

(58) Field of Classification Search
CPC .............. F17C 2205/0394; F17C 13/04; F17C 2221/012; F17C 2223/0123; Y02E 60/50; Y02E 60/32; H01M 8/04201
See application file for complete search history.

(56) References Cited

U.S. PATENT DOCUMENTS

| | | | | |
|---|---|---|---|---|
| 7,537,024 | B2 * | 5/2009 | Adams ..................... | F16L 37/33 |
| | | | | 137/614.04 |
| 8,342,209 | B2 * | 1/2013 | Hasunuma .............. | F16L 37/36 |
| | | | | 138/90 |
| 8,776,843 | B2 * | 7/2014 | Komiya .................... | F17C 3/08 |
| | | | | 141/69 |
| 9,248,416 | B2 * | 2/2016 | Striebinger ....... | B01F 23/23611 |
| 10,525,820 | B2 * | 1/2020 | Takezawa ........... | H01M 8/0656 |
| 11,435,022 | B2 * | 9/2022 | Hasunuma .............. | F16L 55/07 |
| 11,913,605 | B2 * | 2/2024 | Mair ..................... | F17C 13/084 |
| 12,331,884 | B2 * | 6/2025 | Gustafson ............. | F16L 59/141 |
| 12,424,644 | B2 * | 9/2025 | Nakamura ........ | H01M 8/04753 |
| 12,444,760 | B2 * | 10/2025 | Nakamura ............. | B62D 61/04 |
| 12,449,100 | B2 * | 10/2025 | Graci .................... | F17C 13/084 |
| 2005/0255361 | A1 * | 11/2005 | Saito ................... | H01M 8/0278 |
| | | | | 429/513 |
| 2006/0006108 | A1 * | 1/2006 | Arias ................ | H01M 8/04208 |
| | | | | 429/513 |
| 2007/0178351 | A1 * | 8/2007 | Saito ................. | H01M 8/04208 |
| | | | | 429/513 |
| 2008/0057374 | A1 * | 3/2008 | Kurosawa ......... | H01M 8/04201 |
| | | | | 429/513 |
| 2009/0117420 | A1 * | 5/2009 | Nakakubo ......... | H01M 8/04388 |
| | | | | 429/410 |
| 2009/0283351 | A1 * | 11/2009 | Cannet .................. | F17C 13/084 |
| | | | | 137/376 |
| 2011/0275004 | A1 * | 11/2011 | Takahashi ......... | H01M 8/04208 |
| | | | | 429/513 |
| 2022/0410701 | A1 | 12/2022 | Mei | |
| 2024/0117911 | A1 * | 4/2024 | Coleiro ................ | F16L 39/005 |
| 2025/0264190 | A1 * | 8/2025 | Kaneko ................. | F17C 13/04 |
| 2026/0022800 | A1 * | 1/2026 | Tomi ........................ | F17C 5/007 |
| 2026/0022802 | A1 * | 1/2026 | Tomi ........................ | F17C 7/00 |

FOREIGN PATENT DOCUMENTS

| | | | | |
|---|---|---|---|---|
| EP | 4390211 A1 * | 6/2024 | ........ | H01M 8/04425 |
| GB | 1392407 A * | 4/1975 | .............. | F24C 3/14 |
| JP | 2005282697 A * | 10/2005 | | |
| JP | 2007227093 A * | 9/2007 | .............. | H01M 8/04 |
| JP | 2008286340 A * | 11/2008 | ............ | F16L 37/252 |
| JP | 2016070374 A * | 5/2016 | | |
| JP | 2020523533 A * | 8/2020 | ........ | H01M 8/04089 |
| JP | 2023-056952 A | 4/2023 | | |
| WO | WO-2006104014 A1 * | 10/2006 | .............. | F16L 37/30 |
| WO | WO-2007049649 A1 * | 5/2007 | .............. | F16L 37/32 |
| WO | WO-2008095675 A1 * | 8/2008 | ......... | F02M 21/0227 |

* cited by examiner

GAS SUPPLY DEVICE

CROSS-REFERENCE TO RELATED APPLICATION

This application claims priority to Japanese Patent Application No. 2024-062499 filed on Apr. 9, 2024, incorporated herein by reference in its entirety.

BACKGROUND

1. Technical Field

The technology disclosed in the present specification relates to a gas supply device to which a gas cartridge in which hydrogen is stored is detachably attachable, and which supplies hydrogen in the gas cartridge to a hydrogen utilizing device.

2. Description of Related Art

Technology for storing hydrogen in a gas cartridge and attaching the gas cartridge to a hydrogen utilizing device has been proposed (e.g., Japanese Unexamined Patent Application Publication No. 2023-56952 (JP 2023-56952 A)). An example of the hydrogen utilizing device is a fuel cell. JP 2023-56952 A discloses a gas cartridge that is detachably attachable to a hydrogen utilizing device. A main stop valve of the gas cartridge is connected to a connector on the side of the hydrogen utilizing device, in an operation of the cartridge being attached to the hydrogen utilizing device.

SUMMARY

When an impurity is present in a vicinity of the connector at the time of connecting the connector to the main stop valve of the gas cartridge, the impurity may enter the hydrogen utilizing device along with the hydrogen. The present specification provides technology for suppressing impurities from entering when the connector is connected to the main stop valve. Impurities can include liquids and gases, not only solids. In a case in which the hydrogen utilizing device is a fuel cell, oxygen in the air can also be an impurity. This is because when the oxygen that has entered in and hydrogen react on an anode catalyst and a direct reaction occurs, the catalyst deteriorates.

A gas supply device disclosed in the present specification is a device that includes a connector, to which a gas cartridge in which hydrogen is stored and that is also equipped with a main stop valve that seals off the hydrogen is detachably attachable, and that supplies hydrogen to a hydrogen utilizing device via a gas channel that is connected to the connector.

The gas supply device includes a cover for isolating a vicinity of the main stop valve of the gas cartridge that is attached and the connector from the ambient atmosphere, and a removal device for removing an impurity from an inner space of the cover in a state in which the connector and the main stop valve are not in contact.

A controller of the gas supply device connects the main stop valve and the connector following the impurity being removed from the inner space by the removal device, and opens the main stop valve.

Note that the removal device does not need to remove all impurities in the inner space, and that it is sufficient to remove the impurities to an extent such that effects on the hydrogen utilizing device are reduced. The gas supply device disclosed in the present specification isolates the vicinity of the main stop valve and the connector from the ambient atmosphere, and removes impurities from the vicinity of the main stop valve prior to connecting the connector. Accordingly, impurities can be suppressed from entering into the hydrogen utilizing device.

Details of the technique disclosed in the present specification and further improvements will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
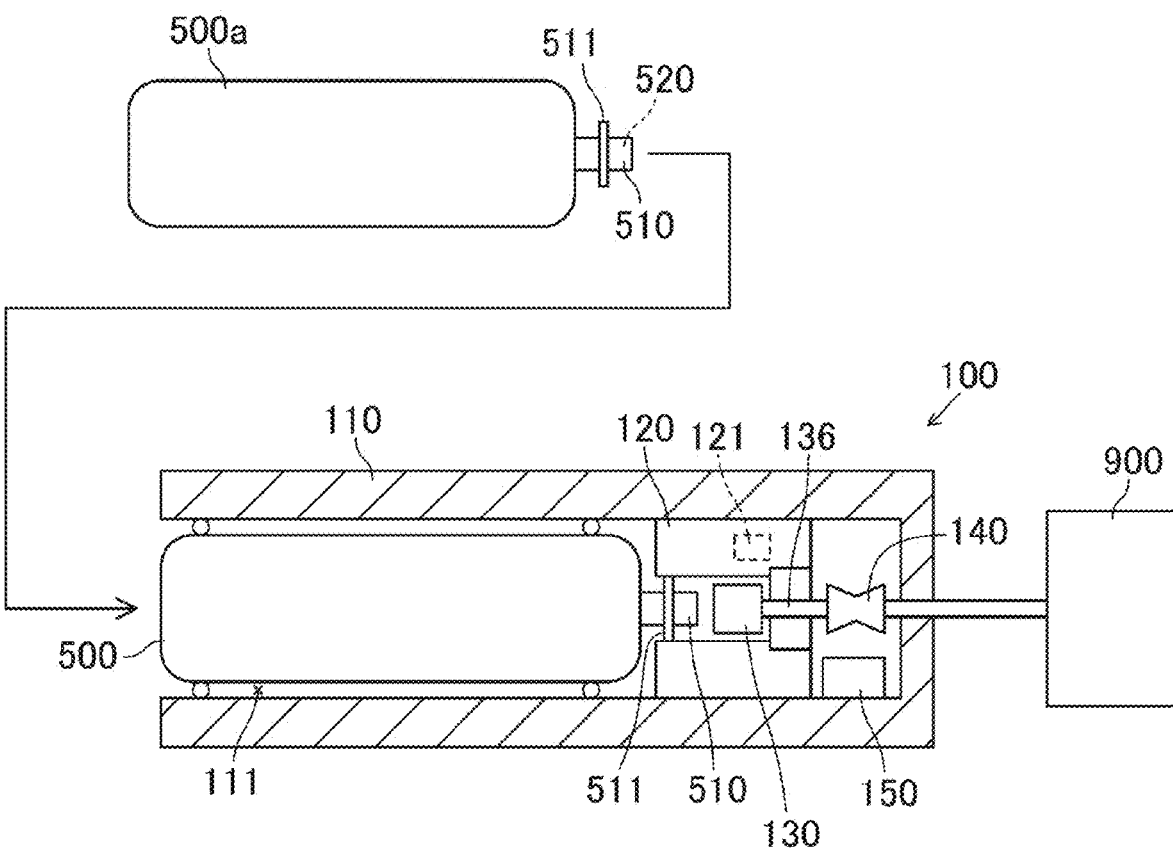
FIG. 1 is a cross-sectional view of a gas supply device 100.

A gas supply device 100 according to an embodiment will be described with reference to the drawings. FIG. 1 is a cross-sectional view of a gas supply device 100. The gas supply device 100 is a device that supplies hydrogen stored in the gas cartridge 500 to the fuel cell 900. The fuel cell 900 corresponds to an example of a hydrogen utilizing device.

The gas cartridge 500 is detachable from the gas supply device 100. The reference numeral 500a in FIG. 1 indicates a gas cartridge prior to being installed in the gas supply device 100. The gas cartridge 500a is inserted into the cartridge accommodating space 111 of the housing 110 of the gas supply device 100 by the user. The base 510 of the gas cartridge 500 is provided with a flange 511. The user inserts the gas cartridge 500 into the cartridge accommodating space 111 and rotates the gas cartridge 500. The cartridge accommodating space 111 is provided with a cartridge holder 120. When the gas cartridge 500 rotates in the cartridge accommodating space 111, the flange 511 is locked to the cartridge holder 120.

The structure in which the gas cartridge 500 is locked to the cartridge holder 120 is not limited to the lock mechanism by rotation, and may be a structure in which the gas cartridge is locked by a frictional force at the time of linear insertion. Alternatively, the gas cartridge 500 may be pushed in manually without using an actuator and locked by the force thereof. A detailed description of the mechanism for locking the flange 511 (i.e., the gas cartridge 500) is omitted.

A connector 130 is disposed in the cartridge accommodating space 111. Further, the base 510 of the gas cartridge 500 is provided with a main stop valve 520. One end of the gas channel 136 is connected to the connector 130, and the other end of the gas channel 136 is connected to the fuel cell 900. An auxiliary valve 140 is attached to the gas channel 136. When the connector 130 is connected to the main stop valve 520 and the main stop valve 520 and the auxiliary valve 140 are opened, the hydrogen gas in the gas cartridge 500 is supplied to the fuel cell 900 through the gas channel 136.

When the gas cartridge 500 is secured to the cartridge holder 120, the base 510 faces the connector 130. The cartridge holder 120 is provided with an actuator 121, and when the actuator 121 is operated, the base 510 (the gas cartridge 500) is drawn toward the connector 130. The connector 130 is provided with a push rod, which will be described later, and when the base 510 approaches the connector 130, the push rod pushes open the main stop valve 520. The configuration of the connector 130 will be described later with reference to FIG. 2A, FIG. 2B, and FIG. 2C.

The actuator 121 includes, for example, a ball screw and a stepping motor. When the stepper motor rotates the ball screw, the jig holding the flange 511 moves toward the connector 130. That is, the gas cartridge 500 approaches the connector 130. Since a known structure may be adopted for the actuator 121, a specific structure of the actuator 121 will not be described. The actuator 121 may move the connector 130 toward the base 510. The actuator 121 may be any mechanism that moves one of the gas cartridge 500 and the connector 130 toward the other. The structure in which the gas cartridge 500 is locked to the cartridge holder 120 is not limited to the lock mechanism by rotation, and may be a structure in which the gas cartridge is locked by a frictional force at the time of linear insertion. Alternatively, the gas cartridge 500 may be pushed in manually without using an actuator and locked by the force thereof. The gas supply device 100 is provided with a controller 150, and the controller 150 controls the actuator 121 and the auxiliary valve 140.

Figure 2A:
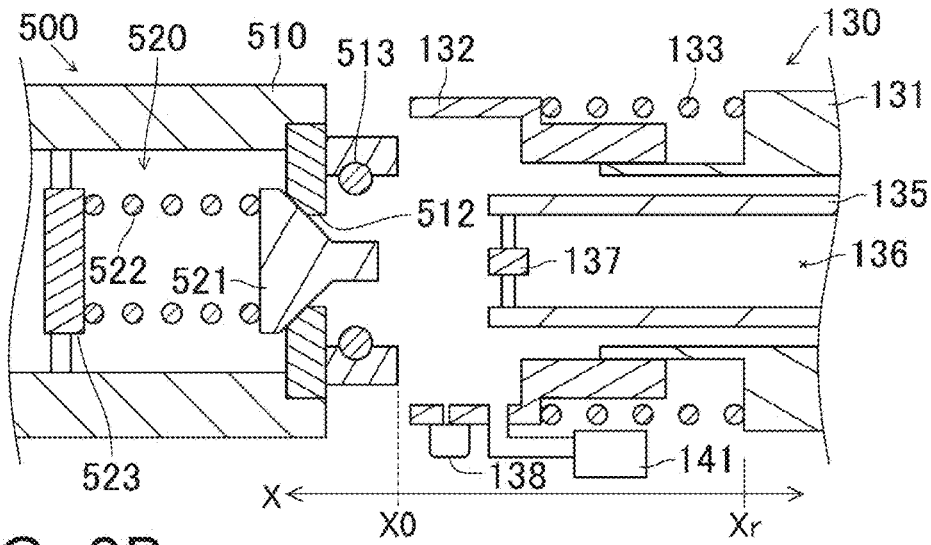
FIG. 2A is a cross-sectional view of a connector-peripheral.
Figure 2B:
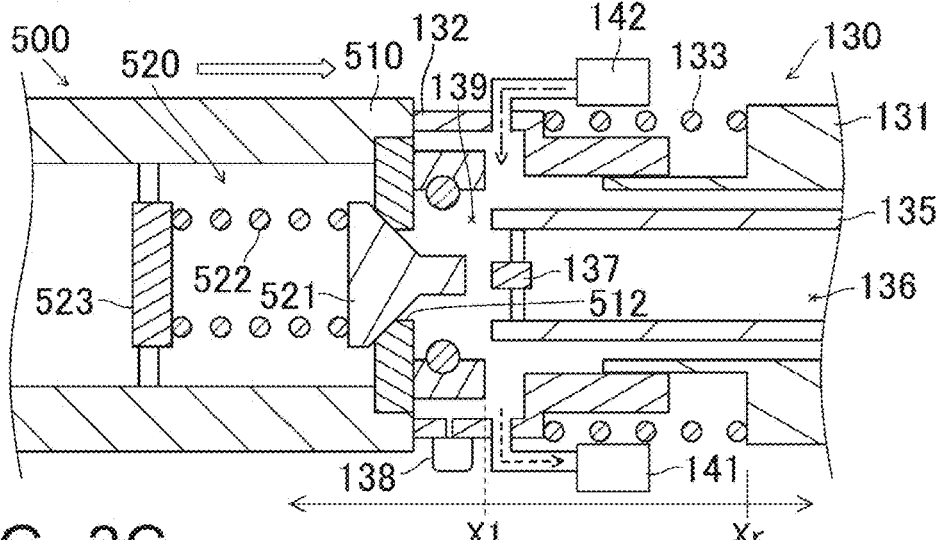
FIG. 2B is a cross-sectional view of a connector peripheral.
Figure 2C:
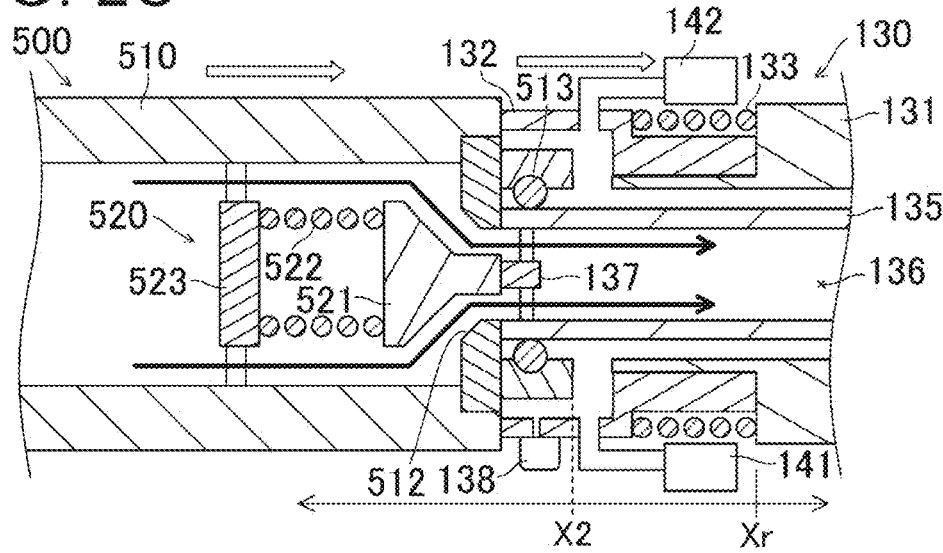
FIG. 2C is a cross-sectional view of a connector peripheral.

A cross-sectional view of the periphery of the connector 130 is shown in FIG. 2A, in FIG. 2B, and in FIG. 2C. The connector 130 is provided with a cover 132 and a push rod 135. A main stop valve 520 is provided inside the base 510 of the gas cartridge 500. As previously discussed, the actuator 121 moves the gas cartridge 500 such that the base 510 approaches the connector 130.

Movement is outlined until the base 510 approaches the connector 130 and the main stop valve 520 is opened. FIG. 2A shows the gas cartridge 500 prior to the base 510 contacting the cover 132. As the gas cartridge 500 approaches the connector 130, the cover 132 abuts the base 510. In FIG. 2B shown in the drawing, the base 510 is contacted with the cover 132. When the gas cartridge 500 further approaches the connector 130, the push rod 135 of the connector 130 pushes the valve body 521 of the main stop valve 520 to the inside of the gas cartridge 500, and the main stop valve 520 opens. FIG. 2C shows the main stop valve 520 open.

The operation until the main stop valve 520 is opened will be described in detail. First, the structure of the gas cartridge 500 will be described. The gas cartridge 500 includes a main stop valve 520 in the base 510. The main stop valve 520 blocks an opening 512 provided in the base 510. When the main stop valve 520 is opened, hydrogen in the gas cartridge 500 is jetted out through the opening 512.

The main stop valve 520 includes a valve body 521 that closes the opening 512 from the inside of the gas cartridge 500, and a spring 522 that presses the valve body 521 against the opening 512. The rear end of the spring 522 abuts against a stopper 523 provided inside the gas cartridge 500. When the spring 522 presses the valve body 521 against the opening 512, the opening 512 is closed. When the valve body 521 is pushed into the gas cartridge 500 from the outside of the gas cartridge 500, the main stop valve 520 opens and hydrogen is ejected.

The structure of the connector 130 of the gas supply device 100 will be described. The connector 130 includes a push rod 135, a cover 132, a pressure sensor 138, and a suction device 141 secured to the connector base 131. The inside of the push rod 135 serves as a gas channel 136. Further, a push piece 137 is provided at a tip end of the push rod 135. The push piece 137 pushes the valve body 521. Note that the push piece 137 does not block the gas channel 136 of the push rod 135, and when the main stop valve 520 is opened, hydrogen flows through the side of the push piece 137 to the gas channel 136.

The cover 132 is attached to the connector base 131 so as to be movable forward and backward. The cover 132 is biased toward the base 510 by a spring 133. The tip of the cover 132 is located closer to the base 510 than the tip of the push rod 135 (the push piece 137). In FIG. 2A shown, the base 510 and the cover 132 are separated from each other. In this state, the connector 130 (the push rod 135 and the gas channel 136) inside the cover 132 is exposed to the outside air. More specifically, the opening of the connector 130 (the opening at the distal end of the gas channel 136) is disposed inside the cover 132, and in FIG. 2A shown in the drawing, the opening of the connector 130 is exposed to the outside air.

The above-described actuator 121 brings the gas cartridge 500 closer to the connector 130. The X-axis in the drawing indicates the moving direction of the base 510. Position Xr refers to a reference position secured to the connector base 131. In the illustrated FIG. 2A, the distal end of the base 510 is located at X0.

When the actuator 121 brings the gas cartridge 500 closer to the connector, the cover 132 comes into contact with the base 510 (see FIG. 2B). The distal end of the base 510 is located on a X1 closer to the connector 130 than X0.

The cover 132 has a cylindrical shape surrounding the valve body 521 of the main stop valve 520. When the tip end of the cover 132 abuts against the base 510, the portion exposed to the outside of the main stop valve 520 (that is, the valve body 521) and the opening of the connector 130 (the tip end of the gas channel 136) are blocked from the outside air. Since the cover 132 is pressed against the base 510 by the spring 133, hydrogen does not leak from the boundary between the cover 132 and the base 510.

A suction port of the suction device 141 opens inside the cover 132. When the cover 132 shuts off the opening of the main stop valve 520 and the connector 130 from the outside air, the controller 150 (see FIG. 1) activates the suction device 141 to exhaust the air in the inner space 139 of the cover 132. A pressure sensor 138 is associated with the connector 130, and the pressure sensor 138 measures the pressure in the inner space 139 of the cover 132. In FIG. 2B shown, the inner space 139 of the cover 132 means the space between the auxiliary valve 140 and the main stop valve 520 during valve closing. As another example, in a case where another on-off valve is provided on the downstream side (fuel cell side) of the auxiliary valve 140, the space may be a space up to the upstream side (gas cartridge side) of the on-off valve.

When the pressure in the inner space 139 falls below a predetermined threshold pressure, the controller 150 stops the suction device 141 and brings the gas cartridge 500 closer to the connector 130. The threshold pressure is set to a value lower than the outside air pressure.

When the distal end of the base 510 is further closer to the connector 130 than the position X1, the push piece 137 provided at the distal end of the push rod 135 pushes the valve body 521 of the main stop valve 520 to the inside of the gas cartridge 500. The load from the push piece 137 causes the spring 522 to contract and the valve body 521 to retract into the interior of the gas cartridge 500, opening the main stop valve 520. Hydrogen in the gas cartridge 500 passes through the opening 512 and into the gas channel 136 inside the push rod 135. FIG. 2C shows that the base 510 is located in a X2 closer to the connector 130 than X1, and that the push piece 137 pushes open the main stop valve 520 (valve body 521). As described above, the gas channel 136 is connected to the fuel cell 900, and when the auxiliary valve 140 of FIG. 1 is opened, hydrogen is supplied to the fuel cell 900. The thick arrow line in FIG. 2C represents the flow of hydrogen.

The gap between the outer periphery of the push rod 135 approaching the main stop valve 520 and the base 510 is sealed by a gasket 513.

When the cover 132 comes into contact with the base 510, the cover 132 blocks the main stop valve 520 and the connector 130 (the opening of the connector 130) from the outside air. At this time, the main stop valve 520 and the connector 130 are disconnected from each other. When the controller 150 activates the suction device 141 in this state, a part of the air in the inner space 139 of the cover 132 is removed. When the oxygen contained in the air is sent to the anode of the fuel cell 900 together with the hydrogen, the oxygen and the hydrogen react at the anode, and the anode catalyst is damaged. That is, air (oxygen) corresponds to an impurity that degrades the performance of the fuel cell for the anode electrode of the fuel cell 900. The controller 150 of the gas supply device 100 connects the connector 130 to the main stop valve 520 and opens the main stop valve 520 when impurities are removed from the inner space 139 by the suction device 141 in a state where the connector 130 and the main stop valve 520 are not connected. The gas supply device 100 shuts off the main stop valve 520 and the connector 130 from the outside air, and removes impurities (oxygen) from the periphery of the main stop valve 520 prior to connecting the connector 130. Therefore, contamination of the fuel cell 900 with impurities can be suppressed. Impurities include not only oxygen but also substances (e.g., dust and moisture) that affect the operation of the main stop valve 520 and the operation of the fuel cell 900. The action of the suction device 141 also removes those materials from the periphery of the main stop valve 520.

Note that the suction device 141 does not need to remove 100% of all impurities in the inner space 139, and only needs to be able to remove impurities to such an extent that the influence on the main stop valve 520 or the fuel cell 900 is reduced.

Modification

Figure 3A:
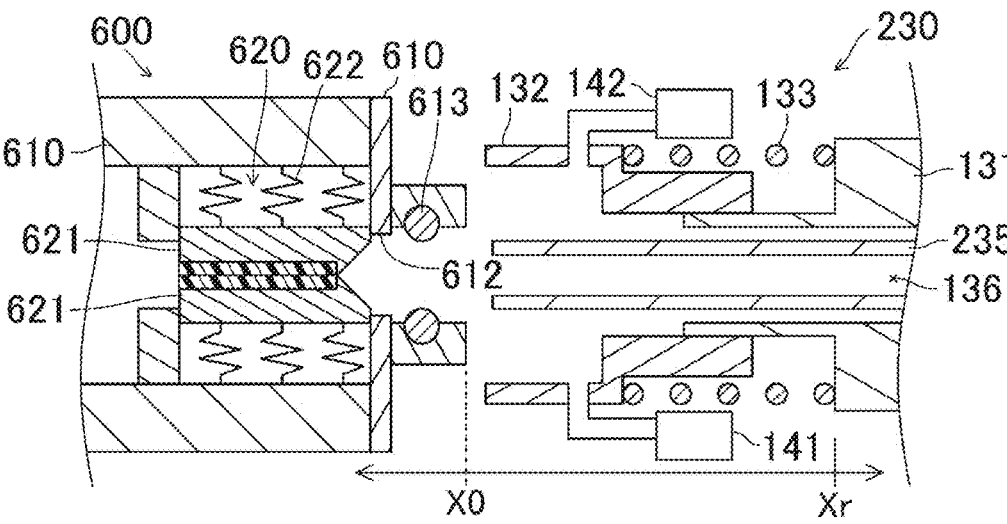
FIG. 3A is a cross-sectional view of the periphery of a modified connector.
Figure 3B:
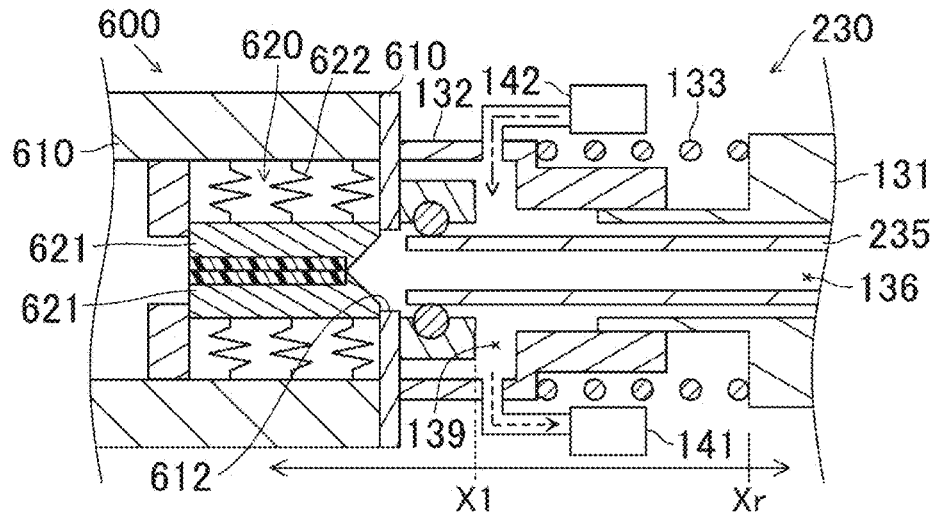
FIG. 3B is a cross-sectional view of the periphery of a modified connector.
Figure 3C:
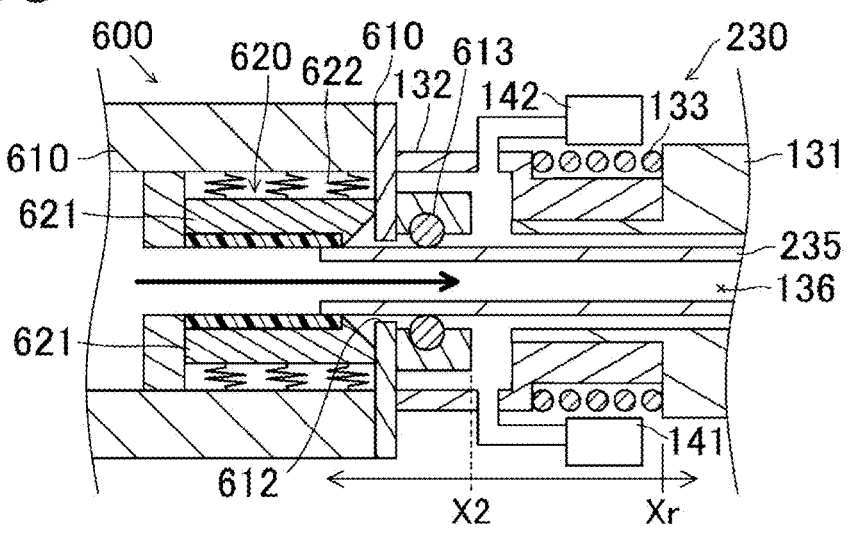
FIG. 3C is a cross-sectional view of the periphery of a modified connector.

A modification of the main stop valve and the connector will be described. FIGS. 3A, 3B and 3C show cross-sectional views of the periphery of a modified main stop valve 620 and a modified connector 230. The gas supply device of the modified example includes an inert gas supplier 142 that supplies nitrogen, which is an inert gas, to the inner space 139.

The main stop valve 620 has two valve bodies 621. The two valve bodies 621 are located inside the opening 612 of the gas cartridge 600. The two valve bodies 621 are pressed against each other by a spring 622 and block the opening 612 of the base 610 (see FIG. 3A).

When the actuator 121 brings the gas cartridge 600 closer to the connector 230, the cover 132 comes into contact with the base 510 (see FIG. 3B). The distal end of the base 510 is located on a X1 closer to the connector 130 than X0.

When the distal end of the cover 132 abuts against the base 510, the opening of the connector 130 (the distal end of the gas channel 136) and the portion exposed to the outside of the main stop valve 620 are blocked from the outside air. The opening of the connector 130 (the distal end of the gas channel 136) and the portion exposed to the outside of the main stop valve 620 are shielded from the outside air in the inner space 139 of the cover 132. Since the cover 132 is pressed against the base 610 by the spring 133, hydrogen does not leak from the boundary between the cover 132 and the base 610. In FIG. 3B, the inner space 139 means the space between the auxiliary valve 140 and the main stop valve 520.

When the cover 132 shuts off the connector 130 and the main stop valve 620 from the outside air, the controller 150 activates the suction device 141 to remove the air in the inner space 139 of the cover 132. A pressure sensor (not shown) is attached to the cover 132, and the pressure sensor measures the pressure in the inner space 139.

When the pressure in the inner space 139 falls below a predetermined threshold pressure, the controller 150 stops the suction device 141 and activates the inert gas supplier 142. Nitrogen is filled from the inert gas supplier 142 into the inner space 139. Note that nitrogen does not affect the anode electrode of the fuel cell 900. When the pressure in the inner space 139 becomes equal to the pressure of the outside air, the controller 150 stops the supply of nitrogen and brings the gas cartridge 600 closer to the connector 230. When the distal end of the base 610 is further closer to the connector 230 than the position X1, the distal end of the push rod 235 pushes open the two valve bodies 621 of the main stop valve 620, and the main stop valve 620 opens (see FIG. 3C). Hydrogen in the gas cartridge 600 passes through the opening 612 and into the gas channel 136 inside the push rod 235. FIG. 3C shows that the base 610 is located on a X2 closer to the connector 130 than X1, and the distal end of the push rod 235 pushes open the main stop valve 620 (valve element 621). The gas channel 136 is connected to the fuel cell 900, and when the auxiliary valve 140 of FIG. 1 is opened, hydrogen is supplied to the fuel cell 900. The thick arrow line in FIG. 3C represents the flow of hydrogen.

The gas supply device having the connector 230 of the modified example also has the same advantages as the gas supply device 100 of the first embodiment.

Second Embodiment

Figure 4:
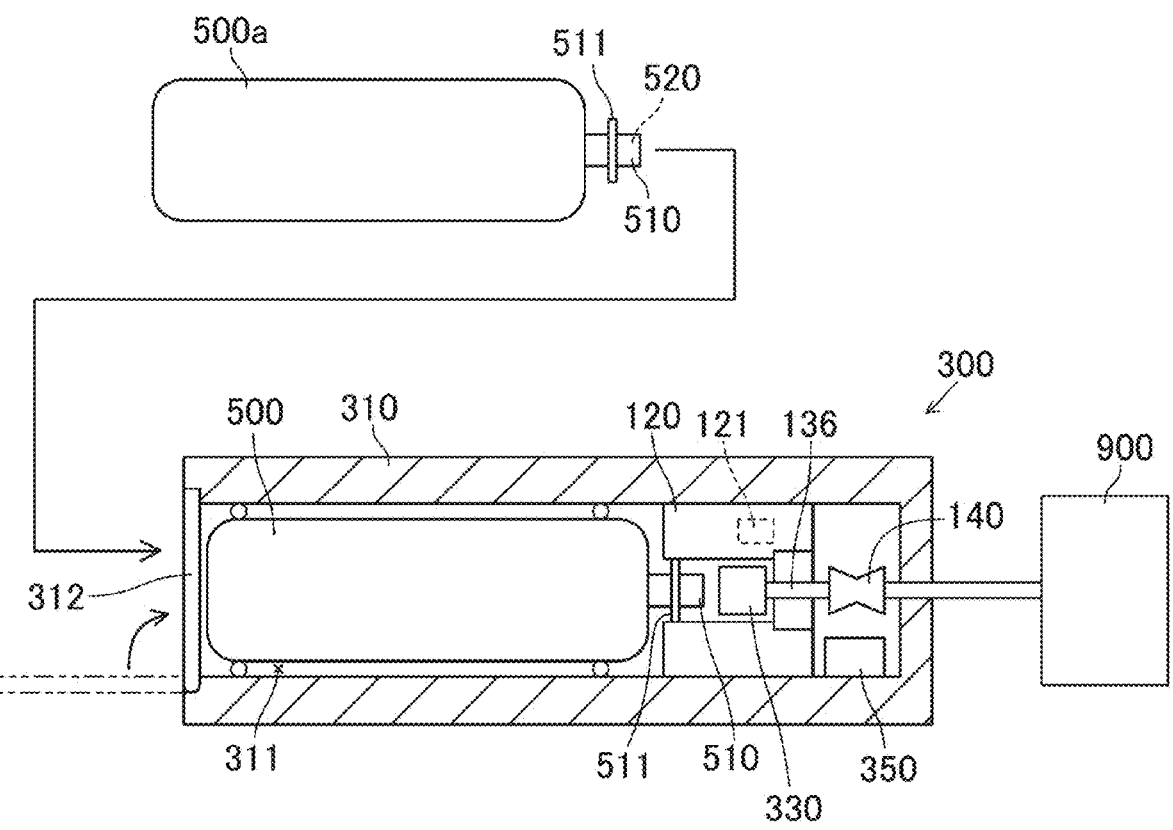
FIG. 4 is a cross-sectional view of the gas supply device 300 of the second embodiment.

FIG. 4 shows a gas supply device 300 according to a second embodiment. The housing 310 of the gas supply device 300 includes a cover 312 that closes the cartridge accommodating space 311. The gas supply device 300 includes a connector 330 similar to the connector 130 of the gas supply device 100 of the first embodiment. The connector 330 does not include the cover 132 and the spring 133 shown in FIG. 2A, FIG. 2B, and FIG. 2C. With the exception of the cover 132 and the spring 133, the connector 330 has the same structure as the connector 130.

In the gas supply device 300, when the gas cartridge 500 is accommodated in the cartridge accommodating space 311 and the flange 511 of the base 510 is fixed to the cartridge holder 120, the controller 350 closes the cover 312. The cover 312 seals the cartridge accommodating space 311. That is, when the cover 312 is closed, the cartridge accommodating space 311 including the main stop valve 520 and the connector 330 is shut off from the outside air. The entire gas cartridge 500 is shielded from the outside air.

The controllers 350 then operate the suction devices 141 (see 2A, FIGS. 2B and 2C) to evacuate air from the cartridge-accommodating space 311. When a predetermined amount of air is removed from the cartridge accommodating space 311, the controller 350 stops the suction device 141, actuates the actuator 121, and brings the main stop valve 520 closer to the connector 330. Similar to the illustrations in FIG. 2A, FIG. 2B, and FIG. 2C, the push piece 137 of the push rod 135 pushes the valve body 521 of the main stop valve 520 and the main stop valve 520 opens.

The gas supply device 300 of the second embodiment, like the gas supply device 100 of the first embodiment, after removing impurities from the periphery of the main stop valve 520 and the connector 130, connects the connector 330 to the main stop valve 520, and opens the main stop valve 520. Therefore, contamination of the fuel cell 900 with impurities can be suppressed.

Some features of the gas supply device described in the examples are listed below. The gas supply device 100 (300) includes a cover 132 (312), a removal device (suction device 141), a connector 130 (330), and a controller 150 (350). A gas channel 136 is connected to the connector 130 (330), and hydrogen is supplied to the fuel cell 900 through the connector 130 (330). The fuel cell 900 is an example of a gas utilization device.

The connector 130 (330) is disposed inside the cover 132 (312). More precisely, the opening of the connector 130 (the opening at the tip of the gas channel 136) is arranged inside the cover 132. The cover 132 (312) blocks the opening of the main stop valve 520 and the connector 130 (330) of the attached gas cartridge 500 from the outside air. More specifically, the cover 132 (312) blocks the opening 512 of the attached gas cartridge 500 and the opening of the connector 130 (330) from the outside air.

The removal device (suction device 141) removes impurities from the inner space 139 of the cover in a state where the connector 130 (330) and the main stop valve 520 (620) are not connected. Here, the impurity means a substance that affects the fuel cell 900 (hydrogen utilizing device). Impurities are either individuals, gases, or fluids. The removal device may be a suction device or an exhaust fan. Note that the expression "the connector and the main stop valve are in the disconnected state" may be distinguished from "the connector and the main stop valve are in the separated state". Further, the expression "the connector and the main stop valve are in a non-connected state" may be distinguished from "the connector and the main stop valve are in a non-contact state".

When a predetermined amount of impurities is removed from the inner space of the cover, the controller 150 (350) connects the connector 130 (330) to the main stop valve 520 and opens the main stop valve 520. When the main stop valve 520 is opened, hydrogen is supplied to the fuel cell 900 through the connector 130 (330). The removal device may not remove all impurities from the inner space, and the controller opens the main stop valve once a certain amount of impurities is removed from the inner space that does not affect the hydrogen utilizing device.

The gas supply devices 100 and 300 include an actuator 121 that brings one of the gas cartridge 500 and the connector 130 (330) closer to the other. In the gas supply device 100, the actuator 121 brings the gas cartridge 500 closer to the connector 130 (330) to the first position X1. Accordingly, since the cover 132 comes into close contact with the gas cartridge 500, the main stop valve 520 (opening 512) of the gas cartridge 500 and the opening of the connector 130 are blocked from the outside air.

When the actuator 121 brings the gas cartridge 500 closer to the connector 130 to the second position X2 closer to the connector than the first position X1, the push rod 135 of the connector 130 abuts against the valve body 521 of the main stop valve 520 to open the main stop valve 520. When the main stop valve 520 is opened, hydrogen in the gas cartridge 500 is supplied to the fuel cell 900.

In the gas supply device 300 of the second embodiment, the cover 312 seals the cartridge accommodating space 311 and blocks the entire gas cartridge 500 from the outside air. The gas supply device 300 further includes an inert gas supplier 142 that supplies an inert gas to the internal space (the sealed cartridge accommodating space 311). Inert gas means a gas (e.g., nitrogen) that does not affect the hydrogen utilizing device (fuel cell 900).

The main stop valve 520 (620) includes a valve body 521 (621) that closes the opening 512 (612) of the gas cartridge from the inside, and a spring 522 (622) that presses the valve body against the opening. The connector 130 (230) includes a push rod 135 (235) that pushes open the valve body from the outside of the gas cartridge. After the impurities in the inner space 139 are removed, the push rod 135 (235) pushes open the valve body. The main stop valve 520 (620) is connected to the connector 130 (230), and the main stop valve 520 (620) and the connector 130 (230) communicate with each other.

The gas supply devices 100 and 300 of the embodiment can suppress contamination of impurities when connecting the main stop valve 520 of the gas cartridge 500 and the connector 130 (330).

The points to be noted regarding the technique described in the embodiment will be described. The fuel cell 900 is an example of a hydrogen utilizing device. The technology disclosed herein can also be applied to other hydrogen utilizing devices, such as hydrogen engines that burn hydrogen, and hydrogen combustion burners for kitchens.

Conventional gas supply devices have the following problems. Due to the structure of the detachable cartridge tank, the valve element and the opening (also referred to as a valve seat) of the main stop valve on the tank side and the push rod on the connector side are exposed to the atmosphere in a separated state. As a result, in addition to oxygen biting, a state has occurred in which a liquid such as a solid foreign substance (e.g., dust, sand) or moisture adheres to or surrounds the vicinity of the opening or the surface of the push rod. When this foreign matter (solid, liquid, or gas) is left to open the main stop valve and hydrogen is supplied from the tank to the fuel cell, an abnormality of the fuel cell is caused, or a solid foreign matter adheres to the valve body and the opening, which causes a valve opening and closing abnormality at the next valve opening/closing. Further, when the hydrogen utilizing device is a hydrogen engine, combustion deterioration at the time of starting occurs due to oxygen mixing at the time of starting.

In the exemplary gas supply device, the main stop valve 520 and the connector 130 are surrounded by the main stop valve 520 and the connector 130 in front of the connection supply (in the state shown in FIG. 2B), that is, in the state shown in FIG. 2C. In the gas supply device of the embodiment, in this state, various foreign matters are sucked and removed, and then hydrogen is supplied, so that it is possible to suppress contamination of foreign matters into the fuel cell and valve abnormality of each valve.

Before the suction is performed, a step of forcibly removing a foreign substance such as air blowing on the surface of the main stop valve 520 and the connector 130 where the foreign substance easily adheres and the periphery thereof, nitrogen replacement in the second embodiment, and liquid cleaning may be added. When the suction step is performed after the forced removal step, the reduction of foreign matter (solid, liquid, or gas) around the main stop valve 520 and the connector 130 is improved.

Although specific examples of the disclosure have been described in detail above, the examples are merely examples and do not limit the scope of claims. The technique described in the claims includes various modifications and variations of the specific examples exemplified above. The technical elements described in the present specification or in the drawings exhibit technical usefulness alone or in various combinations, and are not limited to the combinations described in the claims at the time of filing the application. In addition, the technique exemplified in the present specification or drawings can achieve a plurality of purposes at the same time, and achieving one of the purposes itself has technical usefulness.

What is claimed is:

1. A gas supply device that includes a connector, to which a gas cartridge in which hydrogen is stored and that is also equipped with a main stop valve that seals off the hydrogen is detachably attachable, and that supplies hydrogen to a hydrogen utilizing device via a gas channel that is connected to the connector, the gas supply device comprising:

a cover for isolating a vicinity of the main stop valve of the gas cartridge that is attached and the connector from ambient atmosphere;

a removal device for removing an impurity from an inner space of the cover in a state in which the connector and the main stop valve are not in contact; and a controller for connecting the main stop valve and the connector following the impurity being removed from the inner space by the removal device, and opening the main stop valve.

2. The gas supply device according to claim 1, further comprising:

an actuator for bringing one of the gas cartridge and the connector closer to the other, wherein when the actuator brings the gas cartridge closer to the connector up to a first position, the cover comes into tight contact with the gas cartridge, and when the gas cartridge is brought closer to the connector up to a second position that is closer to the connector than the first position, a push rod of the connector abuts the main stop valve and opens the main stop valve.

3. The gas supply device according to claim 1, wherein the cover isolates an entirety of the gas cartridge from the ambient atmosphere.

4. The gas supply device according to claim 2, further comprising:

an inert gas supplier for supplying an inert gas to the inner space.

5. The gas supply device according to claim 3, further comprising:

an inert gas supplier for supplying an inert gas to the inner space.

* * * * *